United States Patent
Yang et al.

(10) Patent No.: US 8,160,032 B2
(45) Date of Patent: Apr. 17, 2012

(54) COORDINATING COMMUNICATIONS AMONG WIRELESS PERSONAL AREA NETWORK DEVICES

(75) Inventors: Xue Yang, Portland, OR (US); Eran Sudak, Tel Aviv (IL); Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1165 days.

(21) Appl. No.: 11/952,910

(22) Filed: Dec. 7, 2007

(65) Prior Publication Data
US 2009/0147756 A1   Jun. 11, 2009

(51) Int. Cl.
*H04J 3/00* (2006.01)
*H04B 1/38* (2006.01)
(52) U.S. Cl. .................. 370/336; 370/345; 455/560
(58) Field of Classification Search ............ 370/336
See application file for complete search history.

(56) References Cited

U.S. PATENT DOCUMENTS

| | | | |
|---|---|---|---|
| 6,760,317 B1 * | 7/2004 | Honkanen et al. | 370/329 |
| 7,016,396 B2 | 3/2006 | Agrawal | |
| 7,218,669 B2 * | 5/2007 | Bertrand et al. | 375/219 |
| 2003/0060222 A1 * | 3/2003 | Rune | 455/517 |
| 2004/0209636 A1 * | 10/2004 | Chen et al. | 455/522 |
| 2005/0255877 A1 * | 11/2005 | Fuccello et al. | 455/552.1 |
| 2007/0110053 A1 * | 5/2007 | Soni et al. | 370/389 |
| 2007/0232358 A1 * | 10/2007 | Sherman | 455/560 |
| 2007/0275746 A1 * | 11/2007 | Bitran | 455/509 |
| 2008/0144645 A1 * | 6/2008 | Russell et al. | 370/412 |
| 2009/0003307 A1 | 1/2009 | Yang et al. | |
| 2009/0054009 A1 | 2/2009 | Yang et al. | |

* cited by examiner

*Primary Examiner* — Jeffrey Pwu
*Assistant Examiner* — Noel Beharry
(74) *Attorney, Agent, or Firm* — Schwabe, Williamson & Wyatt, P.C.

(57) ABSTRACT

Embodiments of a multi-radio wireless communication device having two or more radio modules are generally described herein. In some embodiments, an initiating link manager may generate and transmit messages to a responding link manager. The messages may include a desired slot offset value and a desired point in time to perform slot adjustment. The responding link manager may return with a message indicating acceptance or nonacceptance of the desired slot offset value. If the responding link manager accepts the desired slot offset value, the message may also include whether the slot adjustment may be implemented at the desired point in time or incrementally. Other embodiments may be described and claimed.

23 Claims, 7 Drawing Sheets

COORDINATING COMMUNICATIONS AMONG WIRELESS PERSONAL AREA NETWORK DEVICES

FIELD

Embodiments of the present invention relate to the field of wireless communications and, in particular, to coordinating communications among wireless personal area network devices.

BACKGROUND

Multi-radio platforms are wireless communication devices with co-located transceivers that communicate using two or more communication techniques. One issue with multi-radio platforms is that interference between receptions and transmissions of the co-located transceivers may result in packet loss from collisions degrading the communication abilities of the radios. This is especially a concern in multi-radio platforms that include a wireless local area network (WLAN) transceiver (and/or a wireless metropolitan area network (WMAN) transceiver) and a wireless personal area network (WPAN) transceiver because their radio frequency (RF) spectrums can be adjacent or overlapping.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrases "A/B" and "A and/or B" mean (A), (B), or (A and B). For the purposes of the present invention, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
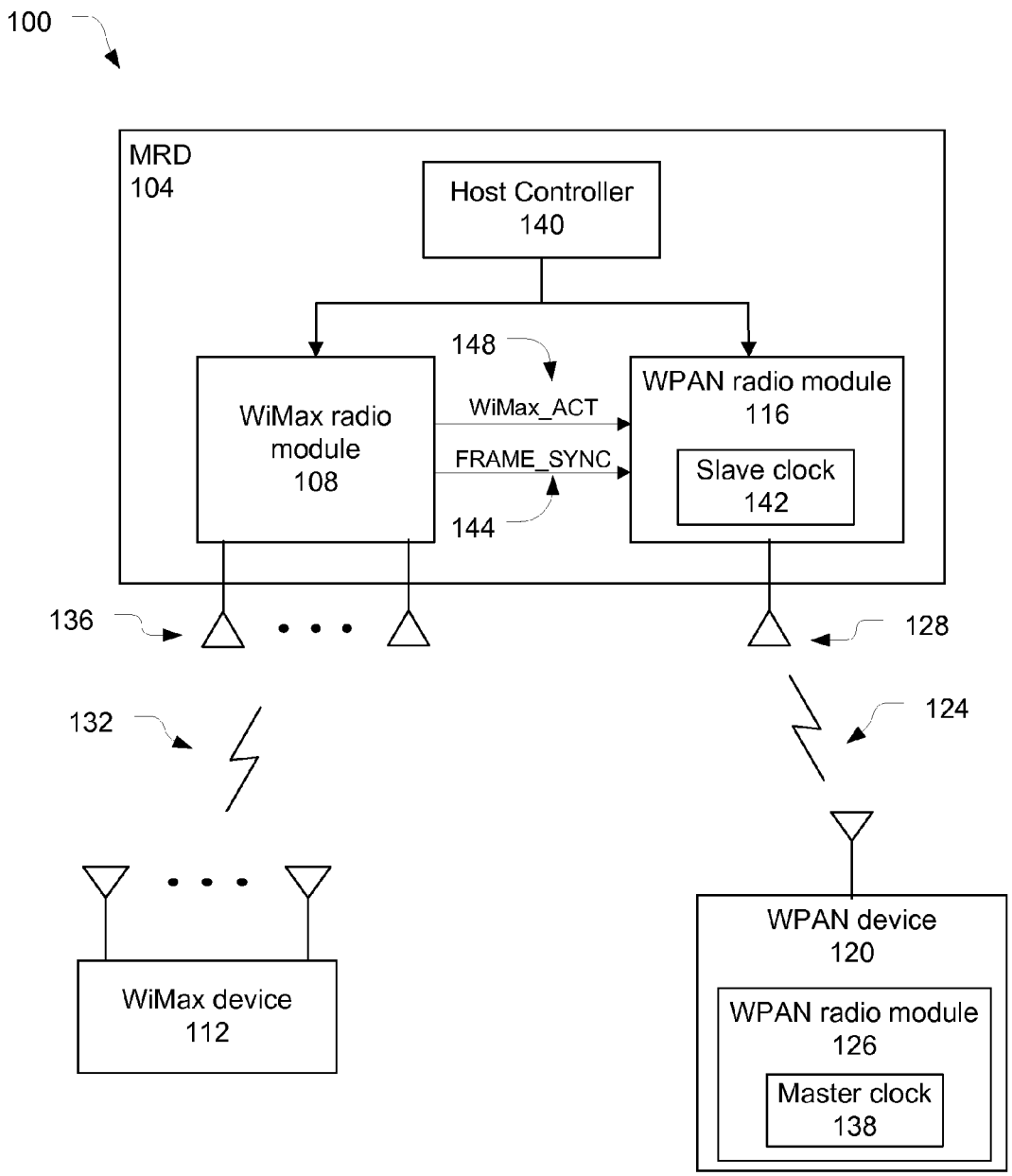
FIG. 1 illustrates a communication environment in accordance with various embodiments of the present invention.

FIG. 1 illustrates a communication environment 100 in accordance with some embodiments of the present invention. The communication environment 100 may include a multi-radio wireless communication device (MRD) 104 that provides wireless communications in accordance with two or more wireless communication technologies. In particular, the MRD 104 may have a first radio module 108 configured to communicate with a wireless network device 112 according to a first wireless network communication technology and a second radio module 116 configured to communicate with a wireless network device 120 in accordance with a second wireless network communication technology. Other embodiments may have additional radio modules.

In some embodiments, the first wireless network communication technology may be a WMAN technology such as, but not limited to, an Institute of Electrical and Electronics Engineers (IEEE) 802.16(e)—2005 standard (including any updates, revisions or amendments thereto). A WMAN technology may also be referred to as a Worldwide Interoperability for Microwave Access (WiMax) technology. In this context, the first radio module 108 may also be referred to as WiMax radio module 108 and the wireless network device 112 may also be referred to as WiMax device 112. Other embodiments may utilize other computer network technologies (e.g., WLAN technologies) and/or cellular network technologies.

In some embodiments, the second wireless network communication technology may be a WPAN technology such as a frequency hopping spread spectrum (FHSS) technology (e.g., Bluetooth® v2.1+enhanced data rate (EDR) as adopted on Aug. 1, 2007 (including any updates, revisions, and amendments thereto) or other Bluetooth versions), etc. Accordingly, in this context, the radio module 116 may also be referred to as WPAN radio module 116 and the wireless network device 120 may also be referred to as a WPAN device 120. The WPAN device 120 may also have a WPAN radio module 126.

In some embodiments, both the first and second wireless network technologies are time division duplexing (TDD) technologies.

The WPAN radio module 116 may establish a link 124 with a WPAN radio module 126 of the WPAN device 120 using antenna 128. The WiMax radio module 108 may establish a link 132 with the WiMax device 112 using one or more antennas 136.

In some embodiments, antenna 128 and antennas 136 may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input, multiple-output (MIMO) embodiments, WiMax radio module 108 may use two or more of antennas 136 that may be effectively separated to take advantage of spatial diversity and the different channel characteristics that may result between each of antennas 136 and the WiMax device 112.

The MRD 104 may also include a host controller 140 coupled to the WiMax radio module 108 and the WPAN radio module 116 to coordinate communicative operations of the MRD 104.

In some embodiments, the MRD 104 may relay information, such as voice, between WPAN device 120 and WiMax device 112. For example, the WPAN device 120 may be a Bluetooth® (BT) headset and the WiMax device 112 may be a base station coupled with a service network allowing voice information to be communicated (e.g., relayed) between the BT headset and a telephone network, although the scope of the invention is not limited in this respect. In some embodiments, Voice-over-Internet Protocol (VoIP) data may be communicated between the WiMax device 112 and a service network, although the scope of the invention is not limited in this respect.

In some embodiments, the link 124 may be a synchronous connection-oriented (SCO) link/extended (eSCO) link to provide for delay-sensitive transmissions, such as voice communications. These links may provide for a transmission at least every so many slots. In other instances, the link 124 may be an asynchronous connection-oriented link (ACL) for non-delay-sensitive transmissions which may be provided slots based on availability.

In some embodiments, the MRD 104 and/or WPAN device 120 may be portable wireless communication devices, such as a personal digital assistant (PDA), a laptop or portable computer with wireless communication capability, a web tablet, a wireless or cellular telephone, a wireless headset, a pager, an instant messaging device, a digital camera, an access point, a television, a medical device (e.g., a heart rate monitor, a blood pressure monitor, etc.), or other device that may receive and/or transmit information wirelessly.

The co-located radio modules of the MRD 104 may be proximally disposed with respect to one another. Proximally disposed, as used herein, implies that the two radio modules are disposed in a manner such that unrestricted use of one radio module may interfere with communications of the other radio module. As discussed above, having overlapping or adjacent RF spectrums may exacerbate this interference. Accordingly, the components of the MRD 104 may be configured to complementarily adapt communications of the radio modules to mitigate or avoid this interference.

Coordinating the radio modules of the MRD 104 may be facilitated through a two-conductor interface between the radio modules. In some embodiments, WiMax radio module 108 may periodically generate a pulse in a frame synchronization signal, e.g., FRAME_SYNC signal 144, relating to a frame of information communicated on WiMax link 132. The FRAME_SYNC signal 144 may be used by the WPAN radio module 116 for various alignment operations. In some embodiments, WiMax radio module 108 may generate a pulse in the FRAME_SYNC signal 144 every frame or once every number of frames. The pulse may be aligned with the beginning of one of the frames.

In some embodiments, WiMax radio module 108 may also provide a WiMax active signal, e.g., WiMax_ACT signal 148, to the WPAN radio module 116. The WiMax_ACT signal 148 may be asserted during WiMax communication operations that may be potentially interfered with were the WPAN radio module 116 also operating. For example, the WiMax_ACT signal 148 may be asserted during receive periods, e.g., downlink subframes, of the WiMax frame.

In some embodiments, an active connection between the WPAN radio module 116 and the WPAN device 120 via the link 124 may form a piconet. Each piconet may have a piconet master and at least one piconet slave. Communications between the piconet master and piconet slaves may be organized into slave-to-master (STM) communication slots and master-to-slave (MTS) communication slots.

A piconet master, e.g., WPAN device 120, may have a master clock 138 that is derived by adding an offset to a native clock of the WPAN device 120. A piconet slave, e.g., MRD 104, may have a slave clock 142 that is derived by adding an offset to a native clock of the MRD 104. The slave clock 142 may be controlled to be synchronized with the master clock 138 by applying offsets to the native clock based at least in part on receipt of transmissions from the WPAN device 120.

Note that while many embodiments discuss the MRD 104 operating as piconet slave and WPAN device 120 operating as piconet master, other embodiments may have other operating arrangements. For example, MRD 104 may operate as the piconet master and WPAN device 120 may operate as the piconet slave.

In a typical piconet, the piconet master may control the various slave clocks with little concern for issues at the piconet slave devices. However, in this embodiment, with the piconet slave having additional considerations of coordinating the radio modules of the MRD 104, piconet coordination becomes more difficult.

Figure 2:
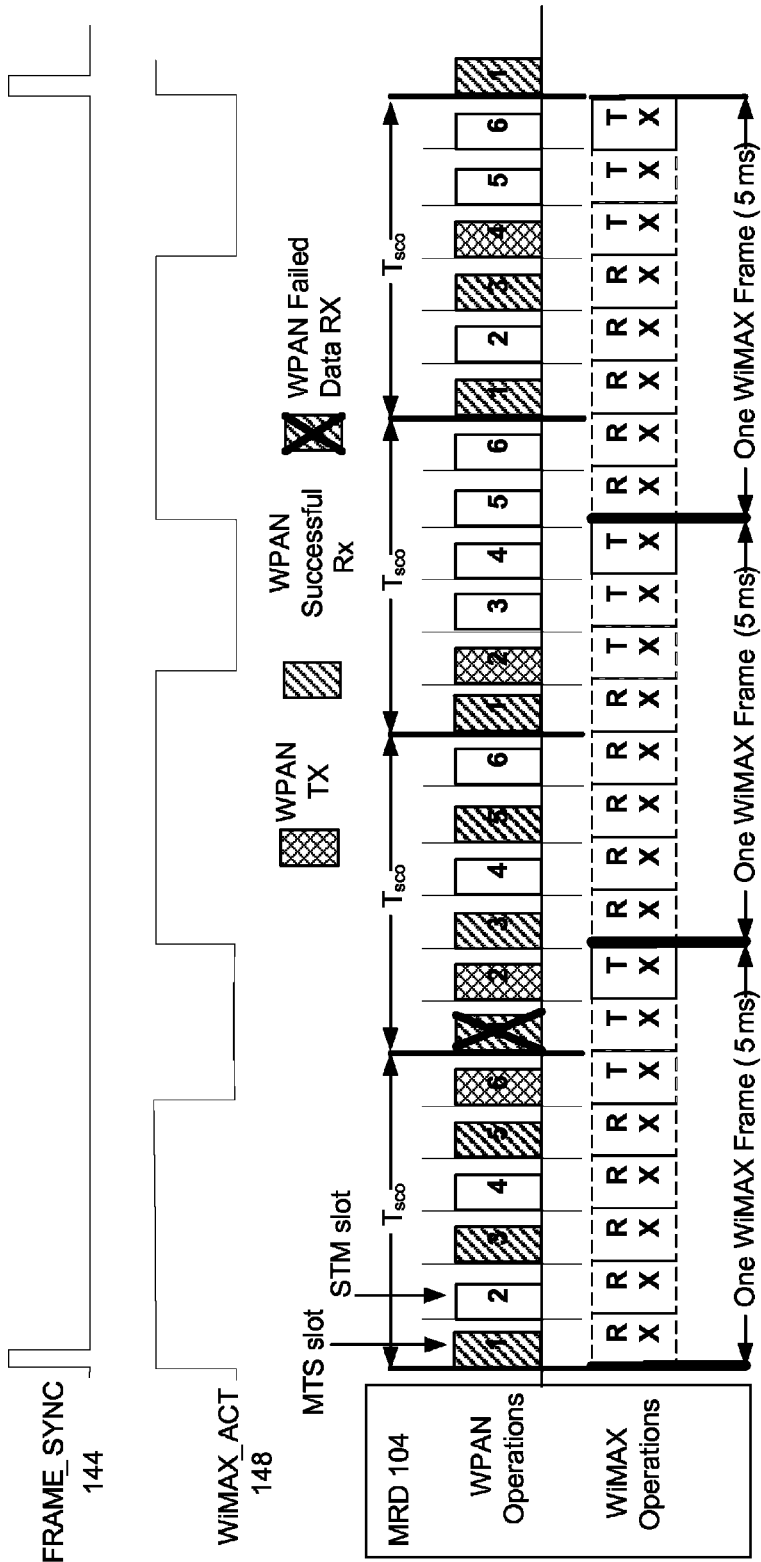
FIG. 2 illustrates performance of complementarily adapted communication of radio modules of a multi-radio wireless communication device in accordance with various embodiments of the present invention.

FIG. 2 illustrates performance of complementarily adapted communication of the radio modules of the MRD 104 in accordance with various embodiments. In this embodiment, four WPAN SCO transmission intervals, e.g., $T_{sco}$ intervals, are depicted along with three WiMax frames. Each Tsco interval may include six WPAN communication slots, which may each be 625 μs. Slots 1, 3, and 5 may be MTS communication slots and slots 2, 4, and 6 may be STM communication slots.

A WiMax frame of 5 milliseconds (ms) may correspond to 8 WPAN communication slots. There may be an overlapping pattern between WPAN and WiMax that repeats every 4 Tsco intervals. The overlapping pattern may vary from interval to interval.

The WiMax frames may be divided into receive (RX) communication periods and transmit (TX) communication periods, which may also be referred to as downlink (DL) subframes and uplink (UL) subframes, respectively. The DL:UL ratio is shown as 5:3 (other ratios may be used in other embodiments). It may be assumed that the WiMax DL subframe needs full protection from interference (e.g., the WPAN radio module 116 may not be allowed to transmit when WiMAX_ACT signal 148 is asserted and the WiMAX_ACT signal 148 is asserted for entire DL subframe duration). It may also be assumed that the WiMax radio module 108 may transmit during every UL subframe. Thus, FIG. 2 may represent a case when the WiMax radio module 108 operates at a full duty cycle causing significant potential to interfere with the WPAN radio module 116. For purposes of this embodiment, the link 124 may be an eSCO link transmitting EV3 packets; however, other embodiments may include other types of links, e.g., SCO, ACL, etc.

Assuming the MRD 104 is operating as the piconet slave, the WPAN radio module 116 may align its MTS slot boundary with the starting time of the WiMax frame through the FRAME_SYNC signal 144. Embodiments discussed below provide further information as to operational procedures that may be used to achieve this alignment.

In the first Tsco interval, the MTS transmission at the reserved slot, e.g., slot 1, may be correctly received, but the transmission in STM slot 2 may not be permitted (due to the WiMax_ACT signal 148 being asserted). Without receiving the acknowledgement from the WPAN radio module 116, the WPAN radio module 126 will retransmit in slot 3 and again in slot 5. The WPAN radio module 116 may eventually be allowed to transmit at slot 6 to complete the packet exchange within the first Tsco interval.

In the second Tsco interval, the packet received at slot 1 from the WPAN radio module 126 may be corrupted by the WiMAX radio module 108 transmissions. The transmission from WPAN radio module 116 at slot 2 proceeds normally. With a negative acknowledgment (NACK) from the WPAN radio module 116, the WPAN radio module 126 may retransmit in slot 3, and the packet may be correctly received by the WPAN radio module 116. However, since the WPAN radio module 116 is not allowed to send the acknowledgement (due to WiMAX_ACT signal 148 being asserted), the WPAN radio module 126 will again harmlessly retransmit in slot 5.

In the third Tsco interval, the WPAN radio module 116 may correctly receive the packet from the WPAN radio module 126 in slot 1, and transmit a packet to the WPAN radio module 126 in slot 2.

In the fourth Tsco interval, the WPAN radio module 116 can correctly receive the packet from the WPAN radio module 126 in slot 1, but the WPAN radio module 116 may not be allowed to transmit in slot 2. Without acknowledgement from the WPAN radio module 116, the WPAN radio module 126 will retransmit in slot 3, and the WPAN radio module 116 can subsequently transmit the packet in slot 4.

In such a manner, with proper alignment being facilitated through procedures discussed in further detail below, packet losses due to proximally disposed radio modules of the MRD 104 may be avoided. This may be the case even if the MRD 104 operates as the piconet slave.

Figure 3:
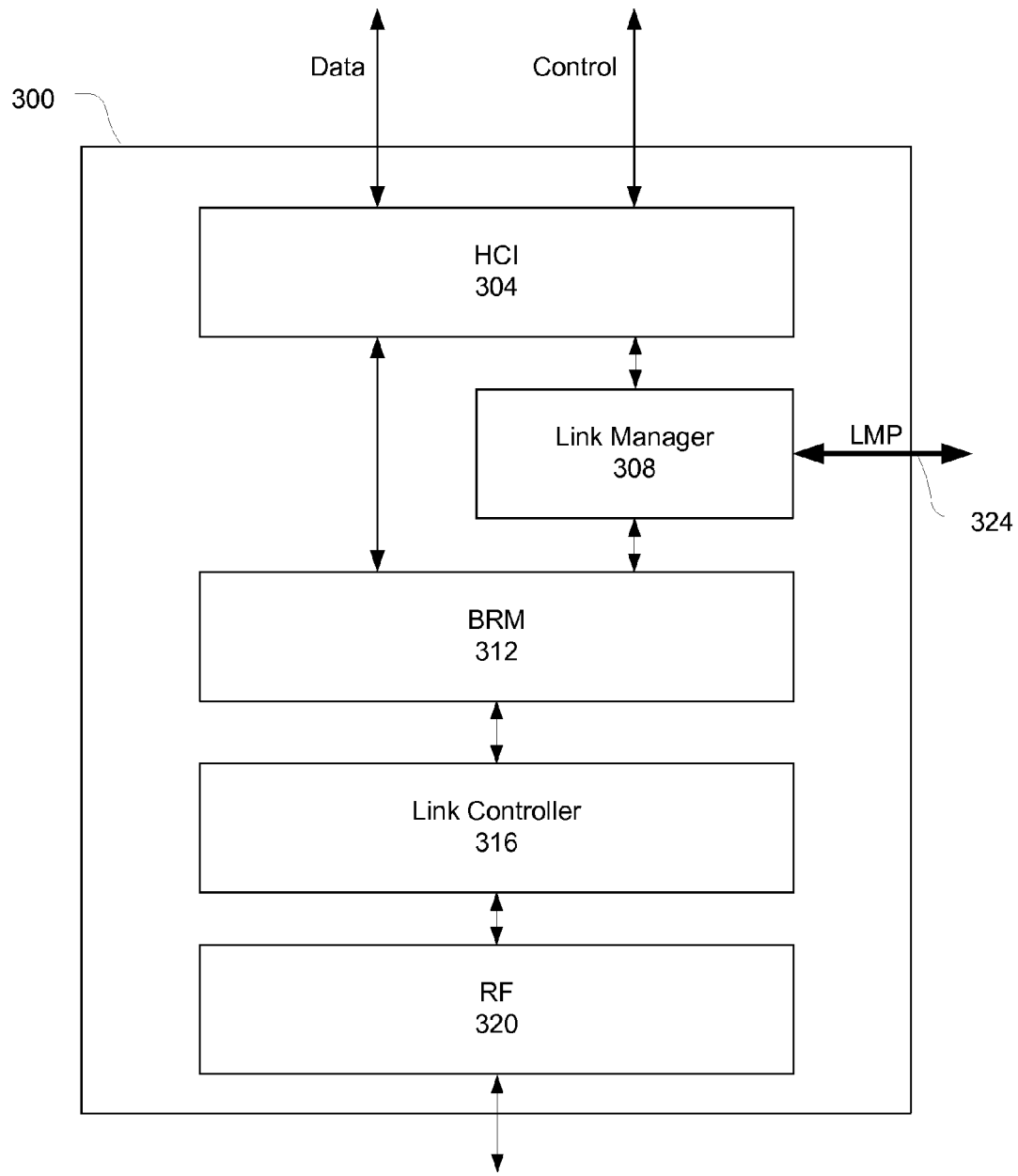
FIG. 3 illustrates a wireless personal area network radio module in accordance with various embodiments of the present invention.

FIG. 3 illustrates a WPAN radio module 300 in accordance with some embodiments of the present invention. The WPAN radio module 300, which may be similar to WPAN radio module 116 or 126, may have a host controller interface (HCI) 304 to provide a command interface for the host controller to various elements of the WPAN radio module 116. The HCI 304 may translate data and control signals between a host controller, a link manager 308 of a link manager layer, and a baseband resources manager (BRM) 312 of a baseband layer, as shown. The baseband layer may also include a link controller 316, which is, in turn, coupled to a radio frequency (RF) block 320 of the radio layer that performs physical processing related to transmissions over the link 124.

The link manager 308 may communicate logical management protocol (LMP) messages (shown logically by the bidirectional arrow 324) with a link manager of a corresponding WPAN radio module over the link 124.

Figure 4:
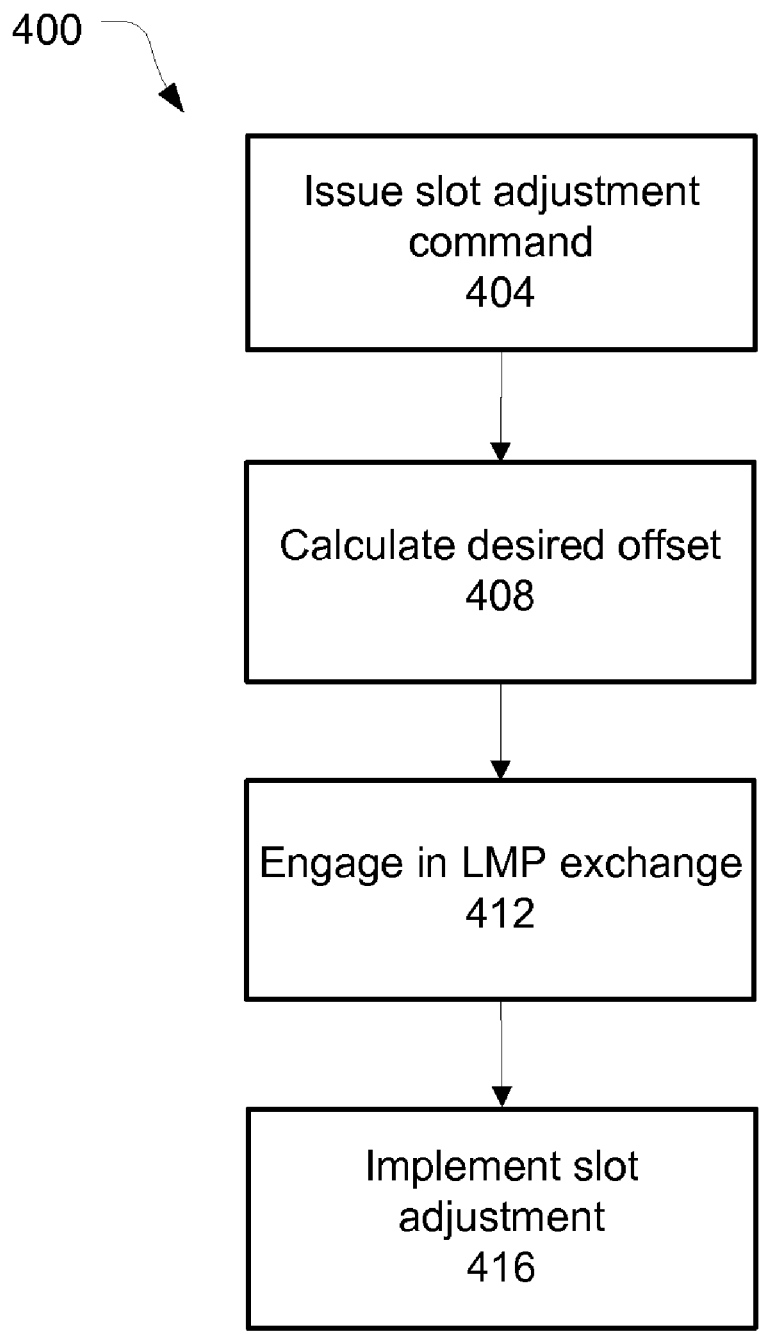
FIG. 4 illustrates a slot adjustment in accordance with various embodiments of the present invention.

FIG. 4 illustrates a slot adjustment 404 in accordance with some embodiments of the present invention. At block 404, the host controller 140 may issue a slot adjustment command, e.g., HCI_Slot_Offset_Req command, to an HCI. The host controller 140 may issue the HCI_Slot_Offset_Req command to initially synchronize the radio modules, followed by periodic issuance as desired. For example, after the radio modules are initially synchronized, the host controller 140 may issue an HCI_Slot_Offset_Req command every Y seconds to account for clock drift of the radio modules. The value of Y may be determined by the alignment accuracy desired between the radio modules. For example, if a WPAN communication slot boundary within a piconet slave is allowed to be shifted +/−5 μs away from the desired position (without jeopardizing the connection with the piconet master), the value of Y may be set up to 0.25 seconds (with 20 parts per million clock accuracy desired by BT standards, a slave clock may drift up to +/−5 μs in 0.25 seconds).

The HCI_Slot_Offset_Req command may include an address parameter, e.g., ADDR, which specifies an address of the WPAN device with which the slot adjustment may be performed, e.g., WPAN device 120.

Figure 5:
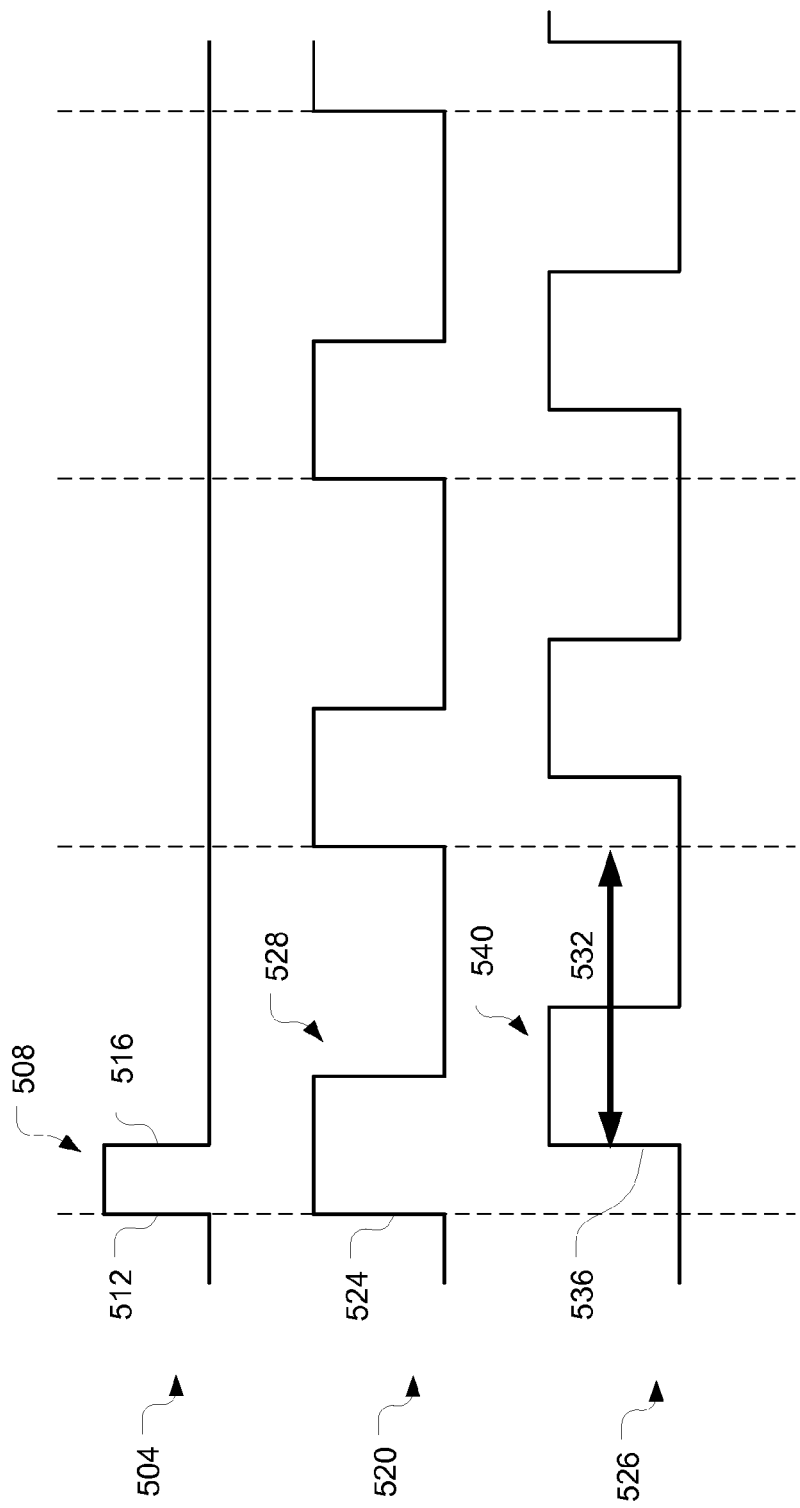
FIG. 5 illustrates waveforms used to calculate a desired slot offset adjustment value in accordance with various embodiments.

At block 408, a link manager may calculate a desired slot offset adjustment value. FIG. 5 illustrates waveforms that may be used to calculate the desired slot offset adjustment value in accordance with various embodiments. A FRAME_SYNC signal 504 may have a pulse 508 with a rising edge 512 and a falling edge 516. Signal 520 may illustrate a desired timing of MTS communication slots, with a rising edge 524 of a first communication slot 528 being aligned with the rising edge 512. Signal 526 may illustrate an actual timing of MTS communication slots. The link manager may determine a desired slot offset value 532, which may be measured between a rising edge 536 of a communication slot 540 and a period boundary 544, that may result in the desired alignment. The desired slot offset may be communicated in terms of microseconds.

Having determined the desired slot offset value, the link manager of the MRD 104 may engage a link manager of the WPAN device 120 in an LMP exchange, at block 412, to effectuate the slot adjustment.

Figure 6:
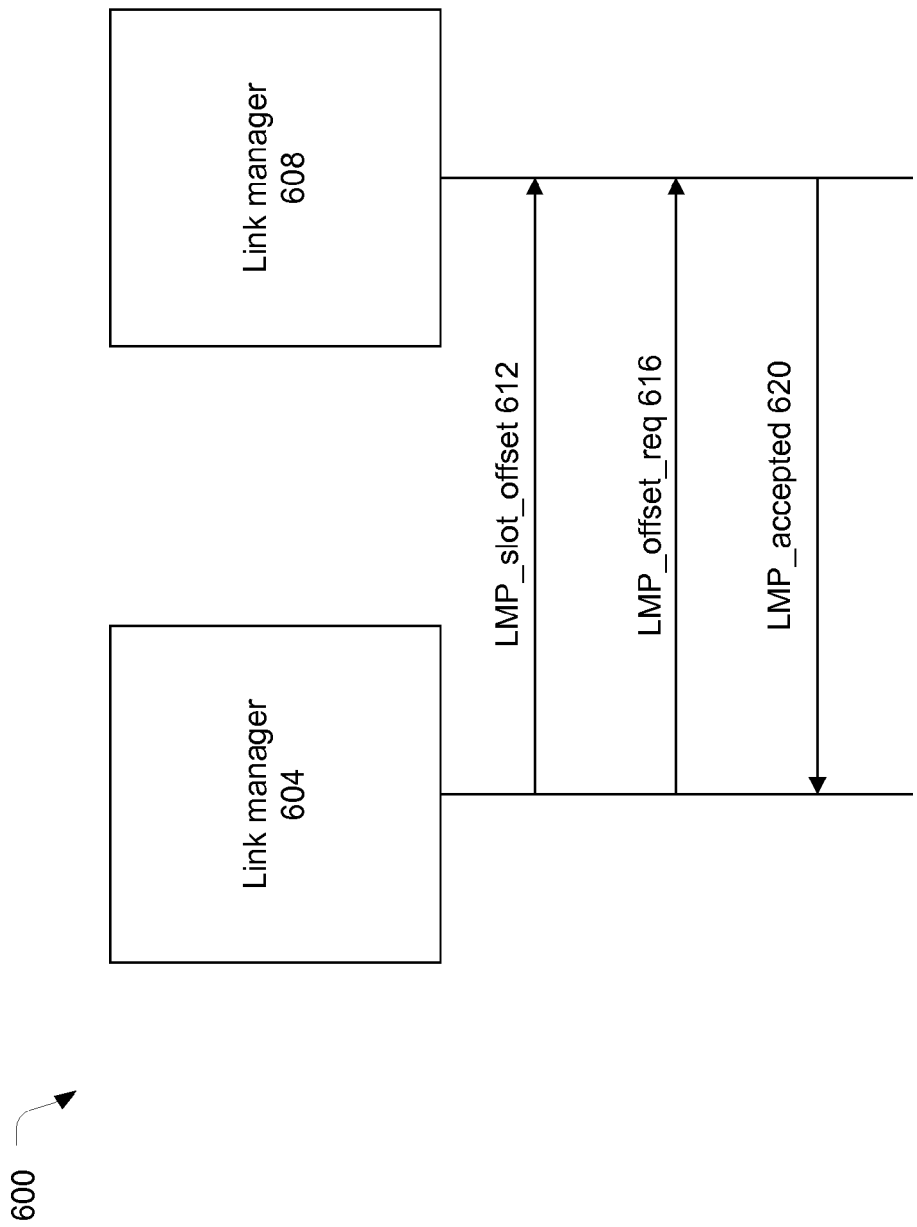
FIG. 6 illustrates a link management protocol exchange between link managers in accordance with various embodiments of the present invention.

FIG. 6 illustrates an LMP exchange 600 sequence between an initiating link manager 604 and a responding link manager 608 in accordance with various embodiments of the present invention. In the context of the present embodiment, the initiating link manager 604 may be part of the WPAN radio module 116 and the responding link manager 608 may be part of the WPAN radio module 126; however, other embodiments may reverse the roles.

The link manager 604 may initiate the exchange by generating and transmitting one or more LMP messages. The one or more LMP messages may include protocol data units (PDUs) such as an LMP_slot_offset PDU 612 and an LMP_offset_req PDU 616.

The LMP_slot_offset PDU 612 may communicate the desired slot offset value, calculated by the link manager 604, to the link manager 608. The LMP_offset_req PDU 616 may communicate the desired point in time in which the offset adjustment is requested to occur (adjustment point). In some embodiments, the LMP_slot_offset PDU 612 and LMP_offset_req PDU 616 may be transferred over an ACL—control (ACL—C) logical link on a default ACL logical transport in pair.

In some embodiments, the link manager 608 may return either an LMP_not_accepted PDU or an LMP_accepted PDU 620 (as shown). The link manager 608 may return an LMP_not_accepted PDU to indicate that the WPAN device 120 will not accept the offset request from the MRD 104.

If the link manager 608 returns the LMP_accepted PDU 620, it may indicate that the WPAN device 120 will accept the offset request. In some embodiments, the LMP_accepted PDU 620 may include one of two possible operational codes (opcodes). The first opcode, e.g., 0x01, may indicate that the offset request is accepted and is to be implemented with one adjustment at the desired adjustment point. Both devices may then adjust their slot boundary by adding the desired offset to their native clock at the desired adjustment point. The WPAN device 120, operating as piconet master, may decide to use this operational code if the WPAN device 120 does not have an active wireless connection with another device (e.g., with another member of the piconet). In this instance, the WPAN device 120 may not be concerned with making the adjustment too abruptly and leaving behind another device.

The second opcode, e.g., 0x02, may indicate that the offset request is accepted and is to be implemented with a plurality of incremental adjustments. In this instance, the desired adjustment point is ignored and the link manager 604 may follow a predefined master/slave synchronization procedure that uses the incremental adjustments. The WPAN device 120 may decide to use this operational code if there are other members of the piconet in addition to the WPAN device 120 and the MRD 104, the WPAN device 120.

Piconet slaves may have a receiving window of approximately ±10 µs. That is, the piconet slave will be able to receive and discern communications as long as the slave clock is within 10 µs of the master clock. Accordingly, in one embodiment, the piconet master may adjust its slot boundary by no more than 10 µs at each increment.

Furthermore, considering that the piconet slave radio module may be proximally disposed to a WiMax radio module, which may disrupt WPAN communications, the piconet master may not proceed with additional offset increments until at least one acknowledgement from slave is received for packets sent from master to slave. Otherwise, if the piconet master keeps on increasing its offset and if slave misses several packets in a row, the slot boundary may move out of the piconet slave's receiving window, resulting in a loss of synchronization between the piconet master and the piconet slave.

At block 416, the WPAN radio module 116 may implement slot adjustment according to adjustment procedure conveyed in the LMP exchange.

The above embodiments describe the LMP_slot_offset and LMP_offset_req PDUs being generated by the piconet slave and transmitted to the piconet master. In other embodiments, MRD 104 may operate as a piconet master. Accordingly, the piconet master may generate and transmit an LMP_slot_offset and/or LMP_offset_req PDU, or their equivalent, to its associated piconet slave in order to facilitate a more efficient slot adjustment. The piconet slave may either reject the offset request, by responding with an LMP_not_accepted PDU, or accept the offset request by responding with LMP_accepted PDU with opcode 0x01. In this manner, the piconet master may explore the possibility of implementing the quicker slot adjustment procedure. If the quicker procedure may be reliably employed, the slot adjustment may take place in a more efficient manner. Otherwise, the more reliable, yet slower, incremental slot adjustment procedure may be employed.

Figure 7:
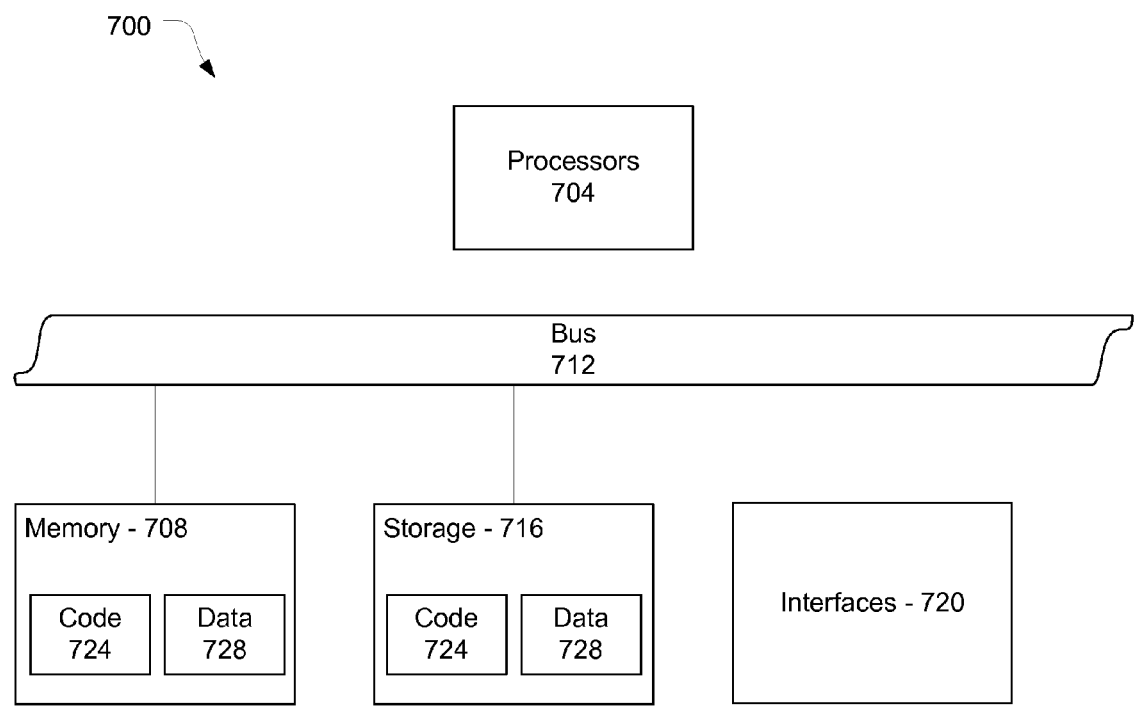
FIG. 7 illustrates a computing device capable of implementing a communication device in accordance with various embodiments of the present invention.

FIG. 7 schematically illustrates a computing device 700 capable of implementing a communication device (e.g., the MRD 104, the WPAN device 120, etc.) in accordance with various embodiments. As illustrated, for the embodiments, computing device 700 includes one or more processors 704, memory 708, and bus 712, coupled to each other as shown. Additionally, computing device 700 includes storage 716, and one or more interfaces 720 coupled to each other, and the earlier described elements as shown. The components of the computing device 700 may be designed to provide the communication and alignment operations of a communication device as described herein.

Memory 708 and storage 716 may include, in particular, temporal and persistent copies of code 724 and data 728, respectively. The code 724 may include instructions that when accessed by the processors 704 result in the computing device 700 performing operations as described in conjunction with various modules of a communication device in accordance with embodiments of this invention. The data 728 may include data to be acted upon by the instructions of the code 724. In particular, the accessing of the code 724 and data 728 by the processors 704 may facilitate communication and alignment operations as described herein.

The processors 704 may include one or more single-core processors, multiple-core processors, controllers, digital signal processors (DSPs), application-specific integrated circuits (ASICs), radio-frequency integrated circuits (RFICs), etc.

The memory 708 may include random access memory (RAM), dynamic RAM (DRAM), static RAM (SRAM), synchronous DRAM (SDRAM), dual-data rate RAM (DDRRAM), etc.

The storage 716 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 716 may be a storage resource physically part of the computing device 700 or it may be accessible by, but not necessarily a part of, the computing device 700. For example, the storage 716 may be accessed by the computing device 700 over a network.

The interfaces 720 may include interfaces designed to communicate with other communication devices, e.g., WiMax device 112, MRD 104, WPAN device 120, etc.

In various embodiments, computing device 700 may have more or less elements and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
a first radio module;
a second radio module, proximally disposed with the first radio module, including a link manager configured to generate one or more messages to another link manager external to the apparatus to cooperatively adapt communication slots of the second radio module to communication periods of the first radio module, the one or more messages having a slot offset value for a slot adjustment and a point in time to perform the slot adjustment; and
a controller configured to operate with another apparatus, which hosts the another link manager, as members of a piconet, with the apparatus acting as a piconet slave when the link manager generates the one or more messages to the another link manager, and the another apparatus acting as a piconet master when the another link manager receives the one or more messages.

2. The apparatus of claim 1, wherein the one or more messages includes a link management protocol (LMP) slot offset protocol data unit (PDU) and an LMP offset request PDU.

3. The apparatus of claim 1, further comprising: a host controller coupled to the second radio module and configured to issue a command to the link manager to initiate adaptation of the communication slots.

4. The apparatus of claim 1, wherein the link manager is further configured to calculate the slot offset value.

5. The apparatus of claim 4, wherein the second radio module is configured to receive a frame synchronization signal from the first radio module and the link manager is further configured to calculate the slot offset value based at least in part on the frame synchronization signal.

6. The apparatus of claim 1, wherein the link manager is further configured to receive one or more messages from the another link manager that indicate acceptance of the slot offset value for the slot adjustment.

7. The apparatus of claim 6, wherein the one or more messages from the another link manager include a first operational code to indicate that the slot adjustment is to occur at the point in time or a second operational code to indicate that the slot adjustment is to occur incrementally.

8. The apparatus of claim 1, wherein the second radio module is configured to operate in accordance with a frequency hopping spread spectrum technology.

9. The apparatus of claim 1, wherein the first radio module is configured to operate in accordance with a Worldwide Interoperability for Microwave Access (WiMax) technology.

10. An apparatus comprising:
an antenna to facilitate wireless communications via a wireless link; and
a radio module coupled to the antenna and including a link manager configured to receive one or more messages from another link manager external to the apparatus, the one or more messages having a slot offset value for a slot adjustment and a point in time to perform the slot adjustment, and to generate one or more messages to the another link manager that indicate the slot offset value for slot adjustment has been accepted and that the slot adjustment is to be performed at the point in time or incrementally;
wherein the apparatus acts as a piconet master when receiving the one or more messages from the another link manager; with an external apparatus hosting the another link manager acting as a piconet slave.

11. The apparatus of claim 10, wherein the one or more messages to the another link manager indicate that the slot adjustment is to be performed at the point in time and the apparatus further comprises: a clock; and the radio module configured to apply an offset, based at least in part on the slot offset value, to the clock at the point in time.

12. The apparatus of claim 10, wherein the one or more messages to the another link manager indicate that the slot adjustment is to be performed incrementally and the apparatus further comprises: a clock; and the radio module configured to apply a plurality of offsets, based at least in part on the slot offset value, to the clock.

13. The apparatus of claim 12, wherein each of the plurality of offsets is less than 10 microseconds.

14. The apparatus of claim 10, wherein the radio module is configured to determine a number of active members of a piconet and the link manager is further configured to generate the one or more messages that indicate that the slot adjustment is to be performed at the point in time or incrementally based at least in part on the number of active members of the piconet.

15. A non-transitory machine-accessible medium, having associated instructions that, when executed, result in the machine:
generating one or more link management protocol (LMP) messages to cooperatively adapt communication slots of a first radio module to communication periods of a second radio module, which is proximally disposed to the first radio module, the one or more messages having a slot offset value for a slot adjustment and a point in time to perform the slot adjustment; and
transmitting the one or more LMP messages to a third radio module of an external device;
wherein the external device acts as a piconet master when receiving the one or more LMP messages and the machine acts as a piconet slave when generating the one or more LMP messages.

16. The non-transitory machine-accessible medium of claim 15, wherein the associated instructions, when executed, further result in the machine:
receiving, at a host controller interface, a command to initiate adaptation of the communication slots.

17. The non-transitory machine-accessible medium of claim 15, wherein the associated instructions, when executed, further result in the machine:
receiving a frame synchronization signal corresponding to the communication periods of the second radio module; and
calculating the offset value based at least in part on the frame synchronization signal.

18. The non-transitory machine-accessible medium of claim 15, wherein the associated instructions, when executed, further result in the machine:
receiving one or more LMP messages that indicate acceptance of the slot offset value for the slot adjustment and a first operational code to indicate that the slot adjustment is to occur at the point in time or a second operational code to indicate that the slot adjustment is to occur incrementally.

19. A system comprising:
a plurality of antennas to facilitate wireless communications via a first wireless link;
a first radio module coupled to the plurality of antennas;
an antenna to facilitate wireless communications via a second wireless link;
a second radio module proximally disposed with the first radio module and coupled to the antenna, the second radio module including a link manager configured to generate and transmit one or more messages to another link manager via the second wireless link to cooperatively adapt communication slots of the second radio module to communication periods of the first radio module, the one or more messages having a slot offset value for a slot adjustment and a point in time to perform the slot adjustment; and
a controller configured to operate with an apparatus, which hosts the another link manager, as members of a piconet, with the system acting as a piconet slave when the link manager generates and transmits the one or more messages to the another link manager, and the apparatus acting as a piconet master when the another link manager receives the one or more messages.

20. The system of claim 19, wherein the second radio module is configured to receive a frame synchronization signal from the first radio module and the link manager is further configured to calculate the slot offset value based at least in part on the frame synchronization signal.

21. The system of claim 19, further comprising: a host controller coupled to the first radio module and the second radio module and configured to issue a command to the link manager to initiate adaptation of the communication slots.

22. The system of claim 19, wherein the link manager is further configured to receive one or more messages from the another link manager that indicate acceptance of the slot offset value for the slot adjustment and further indicate that the slot adjustment is to occur at the point in time or incrementally.

23. The system of claim 19, wherein the second radio module is configured to operate in accordance with a frequency hopping spread spectrum technology.

* * * * *